United States Patent
Müller et al.

(10) Patent No.: US 11,486,754 B2
(45) Date of Patent: Nov. 1, 2022

(54) METHOD FOR DETERMINING AND/OR MONITORING THE FILL LEVEL

(71) Applicant: Endress+Hauser SE+Co. KG, Maulburg (DE)

(72) Inventors: Daniel Müller, Inzlingen (DE); Klaus Pankratz, Kandern (DE); Simon Greth, Lörrach (DE)

(73) Assignee: ENDRESS+HAUSER SE+CO. KG, Maulburg (DE)

( * ) Notice: Subject to any disclaimer, the term of this patent is extended or adjusted under 35 U.S.C. 154(b) by 238 days.

(21) Appl. No.: 16/670,299

(22) PCT Filed: Apr. 10, 2018

(86) PCT No.: PCT/EP2018/059101
§ 371 (c)(1),
(2) Date: Oct. 31, 2019

(87) PCT Pub. No.: WO2018/202387
PCT Pub. Date: Nov. 8, 2018

(65) Prior Publication Data
US 2020/0209046 A1 Jul. 2, 2020

(30) Foreign Application Priority Data
May 2, 2017 (DE) ............... 10 2017 109 316.8

(51) Int. Cl.
*G01F 23/2962* (2022.01)
*G01F 23/80* (2022.01)

(52) U.S. Cl.
CPC .......... *G01F 23/2962* (2013.01); *G01F 23/80* (2022.01)

(58) Field of Classification Search
CPC ............ G01F 23/2962; G01F 23/0061; G01F 25/0061; G01F 23/296; G01F 1/663; G01F 23/2845; G01F 23/2961
See application file for complete search history.

(56) References Cited

U.S. PATENT DOCUMENTS

| 4,700,569 A | * | 10/1987 | Michalski | ........... G01F 23/2962 367/908 |
| 7,209,073 B2 | * | 4/2007 | Spanke | ................. G01F 23/284 342/118 |

(Continued)

FOREIGN PATENT DOCUMENTS

| CN | 104520682 A | 4/2015 |
| CN | 105102943 A | 11/2015 |

(Continued)

*Primary Examiner* — David A. Rogers
(74) *Attorney, Agent, or Firm* — Mark A. Logan; Endress+Hauser (USA) Holding Inc.

(57) ABSTRACT

The present disclosure relates to a method for determining fill level of a substance in a container using a measuring device working according to the travel time principle. The measuring device transmits signals to the fill substance and, based on signal fractions reflected back in the container, ascertains an echo curve. The echo curve is transmitted to a superordinate control unit, and an envelope curve enveloping the echo curve is created and transmitted to the superordinate control unit. The echo curve and envelope curve are evaluated by the superordinate control unit. A wanted echo signal of the echo curve and envelope curve is identified. During the determining of the fill level the fill substance and the container are subjected to a current process. Based on information concerning the current process, plausibility of the wanted echo signal is checked and the evaluation is dynamically adapted to the current process.

16 Claims, 2 Drawing Sheets

(56) References Cited

U.S. PATENT DOCUMENTS

| | | | |
|---|---|---|---|
| 7,965,087 B2* | 6/2011 | Reimelt | G01F 25/0061 |
| | | | 324/533 |
| 8,037,753 B2* | 10/2011 | Fehrenbach | G01F 23/00 |
| | | | 73/290 R |
| 8,220,584 B2* | 7/2012 | Haynes | G01F 23/2962 |
| | | | 181/123 |
| 8,276,444 B2* | 10/2012 | Malinovskiy | G01F 23/2962 |
| | | | 73/290 V |
| 8,332,182 B2* | 12/2012 | Fehrenbach | G01F 23/284 |
| | | | 702/166 |
| 8,410,793 B2* | 4/2013 | Armbruster | G01F 23/266 |
| | | | 324/642 |
| 8,655,605 B2* | 2/2014 | Welle | G01F 23/2962 |
| | | | 702/55 |
| 8,670,950 B2* | 3/2014 | Griessbaum | G01F 23/284 |
| | | | 702/100 |
| 8,700,357 B2* | 4/2014 | Fehrenbach | G01F 23/28 |
| | | | 702/166 |
| 8,813,559 B2* | 8/2014 | Welle | G01F 23/2962 |
| | | | 73/290 V |
| 9,046,404 B2* | 6/2015 | Welle | G01F 23/284 |
| 9,354,100 B2* | 5/2016 | Griessbaum | G01F 23/292 |
| 9,442,000 B2* | 9/2016 | Schmitt | G01F 23/2845 |
| 9,677,922 B2* | 6/2017 | Skowaisa | G01F 23/284 |
| 9,989,401 B2* | 6/2018 | Ferraro | G01F 23/00 |
| 10,168,199 B2* | 1/2019 | Gorenflo | G01F 23/296 |
| 2005/0134501 A1 | 6/2005 | Spanke et al. | |
| 2006/0137446 A1* | 6/2006 | Wennerberg | G01F 23/284 |
| | | | 73/290 V |
| 2010/0182190 A1* | 7/2010 | Spanke | G01F 23/284 |
| | | | 342/124 |
| 2013/0231877 A1* | 9/2013 | Weber | G01F 23/284 |
| | | | 702/55 |
| 2013/0269414 A1* | 10/2013 | Ferraro | G01F 23/2962 |
| | | | 73/1.73 |
| 2014/0109666 A1* | 4/2014 | Blodt | G01F 23/2962 |
| | | | 73/290 R |
| 2015/0007655 A1* | 1/2015 | Skowaisa | G01F 23/284 |
| | | | 73/198 |
| 2015/0101405 A1* | 4/2015 | Gorenflo | G01F 23/0069 |
| | | | 73/290 V |
| 2015/0323370 A1* | 11/2015 | Gorenflo | G01F 25/0061 |
| | | | 702/55 |
| 2016/0153822 A1* | 6/2016 | Gorenflo | G01F 23/284 |
| | | | 73/290 V |
| 2020/0209046 A1* | 7/2020 | Muller | G01F 23/0061 |

FOREIGN PATENT DOCUMENTS

| | | |
|---|---|---|
| CN | 105408729 A | 3/2016 |
| DE | 19824267 A1 | 12/1999 |
| DE | 10260959 A1 | 7/2004 |
| DE | 10325267 A1 | 12/2004 |
| DE | 102004041857 A1 | 3/2006 |
| DE | 102006062606 A1 | 7/2008 |
| DE | 102008016940 A1 | 10/2009 |
| DE | 102010042525 A1 | 4/2012 |
| DE | 102013103532 A1 | 10/2014 |
| DE | 102013109606 A1 | 3/2015 |
| DE | 102014119589 A1 | 6/2016 |
| EP | 0668488 A2 | 8/1995 |
| EP | 2128576 A1 | 12/2009 |
| EP | 1573278 B1 | 5/2016 |
| EP | 1695043 B1 | 7/2016 |
| WO | 2011076478 A2 | 6/2011 |
| WO | 2016202533 A1 | 12/2016 |

* cited by examiner

METHOD FOR DETERMINING AND/OR MONITORING THE FILL LEVEL

CROSS-REFERENCE TO RELATED APPLICATIONS

The present application is related to and claims the priority benefit of German Patent Application No. 10 2017 109 316.8, filed on May 2, 2017 and International Patent Application No. PCT/EP2018/059101, filed on Apr. 10, 2018, the entire contents of which are incorporated herein by reference.

TECHNICAL FIELD

The invention relates to method for determining and/or monitoring the fill level of a fill substance in a container of a process plant with a fill level measuring device working according to the travel time principle.

BACKGROUND

In the case of fill level measuring devices working according to the travel time principle, fill level is ascertained by registering and evaluating a so-called echo curve. Each measured value of the echo curve corresponds to the amplitude of an echo signal reflected on a surface at a certain distance. The transmitter is, for example, an antenna apparatus, via which microwaves are transmitted.

The travel time measuring method is essentially divided into two methods of ascertainment: In the case of time difference measurement, the time, which a broadband wave signal pulse requires for a traveled path, is ascertained. In the case of frequency difference measurement (FMCW—Frequency-Modulated Continuous Wave) a continuous microwave is transmitted, which is frequency modulated periodically and linearly. The frequency of a received echo signal has, consequently, compared with the frequency transmitted at the time of receipt a frequency difference, which depends on the travel time of the echo signal. The frequency difference between transmitted signal and received signal, which can be won by mixing the two signals and evaluating the Fourier spectrum of the mixed signal, corresponds, thus, to the distance of the reflecting area from the antenna. Furthermore, the amplitudes correspond to the spectral lines of the frequency spectrum won by Fourier transformation. The disclosure below is equally applicable to either method of ascertainment.

Other travel time-fill level measuring devices are known, which work, instead of with microwaves or other electromagnetic waves, with ultrasonic waves. Travel time-fill level measuring devices are manufactured and sold by the applicant in a number of different embodiments.

The echo curve includes, in such case, typically an echo signal, which corresponds to the reflection of the transmitted signal on the surface of the fill substance; such being referred to as the wanted echo signal. The echo curve includes, however, also other echo signals referred to as disturbance echo signals. Disturbance echo signals can arise, for example, from reflections of the transmitted signal on objects used in the container, from multipath propagation and from multimode propagation, from foam- and accretion formations of the fill substance and/or from turbulent fill substance surfaces.

The evaluation of an echo curve includes, consequently, firstly, a detection of a number of echo signals of the echo curve and a subsequent identification of disturbance echo signals and the wanted echo signal.

Fill level is then calculated from the travel time of the wanted echo signal. In given cases, there occurs, before the identification of the wanted echo signal and the disturbance echo signals, the creation of an envelope curve enveloping the echo curve and/or a smoothing of the envelope curve; used for this, for example, can be the smoothing procedure described in DE 10 2014 119 589 A1. In the creating of the envelope curve and/or the smoothing, frequently, various freely selectable parameters are used, for example, in an algorithm.

A challenge in travel time-based fill level measurement is reliable identification of the wanted echo signal. Known in the state of the art for this are a number of methods, which can have various problems.

Known, for example, are dynamic methods referred to as "echo tracking" for identification of the wanted echo signal. In such case, the fill level measuring device is told once the current fill level. The fill level measuring device can then identify, based on this predetermined fill level, the associated echo signal as the wanted echo signal and follow such by a suitable algorithm. An example of this is described in European patent EP 1695043 B1. Such an echo tracking has the disadvantage that the echo signal must be tracked without interruption; such is e.g. in the case of a maintenance related interruption not always possible. Additionally, problems can occur, in case during operation the wanted echo signal lies in the region of a disturbance echo signal. This means that the travel time of a disturbance echo signal is the same as the travel time of the wanted echo signal, whereby the case can occur that subsequently incorrectly the disturbance echo is the tracked signal instead of the wanted echo signal.

For overcoming these problems, a method is described in European patent EP 1 573 278 B1, in the case of which following a first start-up of the fill level measuring device a table is created and used subsequently for fill level measurement. The patent supplementally describes performing plausibility checks based on historical data. If it is detected that an incorrect echo signal has been considered as the wanted echo signal, the method is modified, in order subsequently to follow the right echo signal.

DE 10 2013 103 532 A1 discloses another table based method. This delivers reliable measurement results, even when the measurement conditions at the location of use of the fill level measuring device change. In this known method, plausibility checks are performed based on historical and current echo signals, in order to remove historical and/or current echo signals from the table, when they prove not to be plausible.

A further example of an improved echo tracking is described in disclosure document DE 10 2006 062 606 A1. In such case, the echo tracking is combined with a static echo search algorithm, for example, using a masking curve for removing the disturbance echo signals.

Exactly as in the case of the envelope curve creating and/or smoothing, also in all such dynamic and/or static methods for identification of wanted echo signal and disturbance echo signals, freely selectable parameters are used, for example, in an algorithm.

Depending on application, different parameters are used. These are usually selected upon start-up. For this, disclosure document DE 102 609 59 A1 describes storing different parameter sets for different applications in a memory. An evaluation unit of the measurement device serves to select a parameter set, which is used in a following measuring. In this way, the fill level measuring device is, in principle, usable in different applications.

However, also situations can exist, in which it is desired to effect such an adapting of the evaluation, such as e.g. the selection of freely selectable parameters, dynamically, i.e. during measurement operation. Such is the case, for example, when the fill substance and/or the container are/is subjected to certain processes of the process plant, which have/has an influence on the echo curve. A currently transpiring process can influence the fill substance and/or the container in such a manner that a changed evaluating of the echo curve, such as an adapted choosing of the freely selectable parameters, is necessary.

Furthermore, it can happen that the currently running process means that the ascertained fill level changes in an essentially known measure or at least in a known direction. An example of this is described in disclosure document DE 103 252 67 A1. In the therein described method, supplementally to the fill level measurement, the filling- or emptying rate is registered and used for the fill level measurement. For this, e.g. a supplemental flow measuring device or the pump power of a pump and the like is used. In such case, the knowledge concerning the currently running process is suited for checking the plausibility of the wanted echo signal and/or for excluding certain disturbance echo signals in advance.

In all these cases, it is, consequently, in principle, desirable, with knowledge of the current process, to perform an adapting of the evaluation and/or an additional plausibility analysis. In the state of the art, the evaluation of the echo curve occurs in the fill level measuring device, while, in contrast, the process control is often run from a superordinate control unit.

In this way, knowledge concerning the current process lies, firstly, only in the superordinate control unit. If information present in the superordinate control unit concerning a currently running process should be taken into consideration by the fill level measuring device, a transfer and a subsequent further processing in the fill level measuring device must take place.

This, however, introduces additional limitations, for example, relative to the design of a control/evaluation unit, such as, for instance, a microcontroller, for the fill level measuring device, or relative to the energy required by the fill level measuring device. Especially, the maximum energy suppliable to the fill level measuring device is in many cases limited due to safety-relevant standards, for example, when the fill level measuring device is used in explosion endangered areas.

SUMMARY

An object of the invention is to provide a method, with which the current process can be taken into consideration as simply as possible for the evaluation of the echo curve.

The object is achieved by the features of the independent claim.

The solution of the invention resides in a method for determining and/or monitoring the fill level of a fill substance in a container of a process plant with a fill level measuring device working according to the travel time principle and in measurement operation transmitting transmitted signals in the direction of the fill substance in the container and, based on signal fractions reflected back in the container, ascertaining an echo curve, which represents amplitude of the reflected back signal fractions as a function of travel time.

The echo curve is transmitted to a superordinate control unit of the process plant and/or an envelope curve enveloping the echo curve is created and transmitted to the superordinate control unit, wherein the echo curve and/or envelope curve are/is evaluated by the superordinate control unit, wherein in the evaluation of the echo curve and/or envelope curve a wanted echo signal (S) of the echo curve and/or envelope curve is identified, whose travel time is used as basis for ascertaining the current fill level, wherein during the determining and/or monitoring of the fill level the fill substance and/or the container are/is subjected to at least one current process, wherein information concerning at least one current process is furnished in the superordinate control unit, and wherein based on information concerning the current process plausibility of the wanted echo signal is checked and/or the evaluation, especially the identification of the wanted echo signal, is dynamically adapted to the current process.

Subject matter of invention further includes a measurement system, comprising the fill level measuring device and the superordinate control unit, wherein the measurement system is embodied to execute the method of the invention.

The superordinate control unit is, in such case, especially also embodied for control of the process plant. Thus, the at least one process, to which the fill substance and/or the container are/is subjected, is controlled from the superordinate control unit. Of course, it can also be another, superordinate control unit, in which information relative to the currently running process is present.

The expression "dynamically adapting" means in the context of the invention that the checking of the plausibility and/or the adapting of the evaluation occurs during ongoing measurement operation and during the currently running process.

By means of the checking of the plausibility, the information known to the control unit concerning the process is taken into consideration from the point in time known to the superordinate control unit of an occurrence of a certain process for additional plausibility analysis of the ascertained wanted echo signal.

By means of the adapting of the evaluation, the evaluation is adapted from the point in time known to the superordinate control unit of an occurrence of a certain process. If the process, which requires a certain adapting of the evaluation, occurs, in given cases, only during a certain time window, then there is, for example, just a temporary adapting of the evaluation.

Additionally, in the method of the invention, the checking of the plausibility and the adapting of the evaluation can also occur simultaneously. For example, can in the limiting case, in which, upon an evaluation, firstly, two different potential wanted echo signals are identified, the evaluation is adapted in such a manner that that one of the two potential wanted echo signals is identified as the wanted echo signal, which has in view of the current process the higher plausibility.

Advantages of the invention, include the following:
  The entire information present in the superordinate control unit relative to the currently running process is available for evaluation of the echo curve and/or envelope curve. The evaluation of the echo curve and/or envelope curve and the determining of the fill level occurs in the superordinate control unit. In this way, the calculational effort- and/or memory capacities required for such an adapted evaluation does not have to be present in the fill level measuring device, whereby the energy- and/or space requirement of the fill level measuring device is reduced.

By means of the method of the invention, an increased accuracy and/or availability are/is achieved. Increased accuracy results from the fact that the evaluation is always adapted to the current process. Increased availability results from the fact that an evaluation is now also possible in limit cases, in which without such a dynamic adapting no wanted echo signal could be identified.

In an embodiment of the invention, disturbance echo signals of the echo curve and/or envelope curve are identified in the evaluation. The identification of the disturbance echo signals is adapted to the current process.

In an advantageous embodiment of the invention, the evaluation of the echo curve and/or the envelope curve, especially the identification of the wanted echo signal and/or the disturbance echo signals, occurs by means of an evaluation algorithm with at least one freely selectable parameter. The at least one freely selectable parameter is established based on the current process. Of course, also a number of freely selectable parameters can be established based on the current process.

Parameters of an evaluation algorithm, which influence the evaluation of the echo curve and/or the envelope curve, especially the identification of the wanted echo signal and/or the disturbance echo signal, can include, for example, the following:

Parameters, which are used in creating the envelope curve enveloping the echo curve.

Parameters of the above mentioned smoothing procedure, by which disturbance echo signals are averaged out of the envelope curve. Because of the envelope curve smoothing, noise fractions in the signal of an envelope curve are averaged out, in that, for example, outliers in the case of individual sampling points belonging to a travel time are brought in their amplitude to that of their surroundings. An example of a parameter in the case of the smoothing procedure is a time constant, which e.g. is adapted to the rate of change of the current process.

Parameters, which are used in the case of a time averaging of recurringly recorded echo curves and/or envelope curves. If it is known that a certain process or the alternating from a first process to a second process has a strong effect on the envelope curve and/or echo curve, then it makes sense e.g., not to perform time averaging of envelope curves and/or echo curves registered in the different processes.

Parameters of the above mentioned, dynamic echo tracking. In such case, exactly as in the preceding case, in limit cases, information relative to the current process can be utilized simultaneously with the identification, or plausibility analysis, of the wanted echo signal. A limiting case critical for the echo tracking is, for example, the above mentioned case of a disturbance echo signal lying in the region of the wanted echo signal and/or a disturbance echo signal with, for instance, amplitude equal to that of the wanted echo signal.

Parameters of the above mentioned masking curve for masking the disturbance echo signals out. These include especially parameters, by means of which certain regions of the echo curve and/or envelope curve (i.e. certain travel times, or fill levels) are removed by an e.g. static echo search algorithm for identification of echo signals. An example is the so-called block distance, which describes a region in the vicinity of the fill level measuring device, in which echo signals are purposely not detected, or evaluated.

Parameters, which establish a threshold value for the amplitude for identification of echo signals in the echo curve in a static echo search algorithm.

Parameters of an evaluation curve of the echo curve and/or envelope curve. An important parameter here is a so-called evaluation offset, by which sensitivity of the evaluation curve is set. A currently occurring process can lead to a limiting case, where temporarily an increase of the sensitivity is required. Examples of this are sudden foam formation and/or suddenly changing reflection properties of the surface of the fill substance. In such case, the method of the invention provides an increased availability, since otherwise, if the evaluation offset remained the same, a loss of the tracked echo signal would threaten.

Parameters of a tank floor detection algorithm. A tank floor detection algorithm identifies disturbance echo signals caused by reflections on the tank floor. Depending on fill substance, these can have very large echo signal amplitudes. Parameters of these algorithms depend especially on the dielectric constant of the fill substance, so that the tank floor detection is optimized for a certain, known dielectric constant. If the dielectric constant changes because of the process, for example, as a result of mixing in or distilling off of media, an adapting of these parameters enables an improved identification of the disturbance echo signal. A tank floor detection optimized for a fixed dielectric constant would present the danger of ascertaining incorrect measured values for the fill level.

Parameters, which establish a critical value for an acceptable signal/noise ratio. Through use of such a critical value, it can e.g. be checked whether the echo signal amplitude of the identified wanted echo signal is greater than the critical value relative to the echo signal amplitude of each identified disturbance echo signal. Additionally, in limit cases, for instance, in the case of equally large echo signal amplitudes of the wanted echo signal and a disturbance echo signal, information relative to the current process can be utilized simultaneously for identification, or plausibility analysis, of the wanted echo signal.

Parameters, which establish a critical value used in checking the orderly functioning of the fill level measuring device. In such case, reference is made especially to the method disclosed in DE 10 2005 00 31 52 A1, in which e.g. for an identified disturbance echo signal a wanted echo signal to be expected at the site of the disturbance echo signal is determined based on the wanted echo signal and a process dependent, ideal echo curve. Then, by means of a critical value, it is checked whether the expected wanted echo signal at the site of the disturbance echo signal is greater than the critical value relative to each disturbance echo signal.

The examples listed here are in no way limiting for the invention. Thus, other parameters known from the state of the art can be dynamically adapted for evaluating the echo curve and/or the envelope curve.

In a preferred further development of the invention, in an initializing operation different from measurement operation, preferably in the context of a start-up of the fill level measuring device, the fill substance and/or the container are/is subjected to at least one process arising in measurement operation. The fill level measuring device sends in the initializing operation transmitted signals in the direction of the fill substance in the container and ascertains an echo curve based on signal fractions reflected back in the container, wherein the echo curve is transmitted to a superordinate control unit of the process plant and/or an envelope curve enveloping the echo curve is created and transmitted to the superordinate control unit. Influences of the current process on the echo curve and/or the envelope curve are registered by the superordinate control unit. From the influences, at least one specification for adapting the evaluation, especially for adapting the identification of the wanted echo signal and/or the disturbance echo signals, is determined and stored in the superordinate control unit. Preferably, the specification for adapting the evaluation is a selection of the at least one freely selectable parameter. In measurement operation, then the specification stored in the initializing operation, preferably the at least one freely selectable parameter, is used in the dynamic adapting of the evaluation to the current process, especially in the dynamic adapting of the identification of the wanted echo signal.

In this further development of the invention, thus, initializing operation of one or more of those processes, to which the fill substance and/or the container are/is also subjected in measurement operation, are/is run. The change the echo curve and/or envelope curve in reaction to a certain process, which is run in the initializing operation for test purposes, is registered by the superordinate control unit. In such case, there is, depending on process, for example, a constant and, in given cases, known or non-constant and, in given cases, initially known, fill level of the fill substance in the container.

Based on the change of the echo curve and/or envelope curve in reaction to the process, the at least one specification for an adapted evaluating of the echo curve and/or envelope curve is created. For example, it can be found that a certain process requires an adapting of the parameters during measurement operation in a certain time window.

Especially, an adapting of one or more of the above mentioned parameters, such as parameters for masking curves, threshold values and/or limit values for signal/noise ratios, etc., can be required during the time window belonging to a particular process.

Of course, alternatively or supplementally, the superordinate control unit can also use empirical values. For example, earlier collected, empirical values for similar facilities, fill substances and/or processes can be used. Involved in such case can be, for example, stored parameters ("upon alternation from process A to process B→threshold value set to the value X") or stored specifications for adapting the parameters ("upon alternation from process A to process B→lower threshold value by 10%"). These empirical values can be stored, for example, in a database connected with the superordinate control unit. The database can be stored e.g. in a memory unit, or be available decentrally, e.g. in a cloud.

In a preferred embodiment of the invention, the echo curve and/or the envelope curve are/is transmitted, wired and/or wirelessly, to the superordinate control unit via a communication network, especially via a fieldbus of automation technology and/or via Ethernet. Especially, a recurring transmission is used. Such transmission can occur cyclically or acyclically.

For the case, in which the communication network is a wired communication network, such can be, for example, a wired fieldbus of automation technology, for example, a Foundation Fieldbus, Profibus PA, Profibus DP, HART, CANBus, etc. fieldbus. It can, however, also be a modern industrial communication network, for example, an "industrial Ethernet" fieldbus, especially a Profinet, HART-IP or Ethernet/IP fieldbus or a communication network, for example, Ethernet of the TCP/IP protocol.

For the case, in which the communication network is a wireless communication network, it can be, for example, a Bluetooth, ZigBee-, WLAN-, GSM-, LTE-, UMTS communication network or, however, also a wireless version of a fieldbus, especially 802.15.4 based standards, such as wireless HART.

In an embodiment of the invention, the echo curve and/or the envelope curve are/is transmitted to the superordinate control unit only upon query of the superordinate control unit. In this embodiment, the fill level measuring device is, thus, embodied as a slave measuring device, which only transmits the measurement data upon query of a master associated with the superordinate control unit.

In an embodiment of the invention alternative thereto, the echo curve and/or the envelope curve of the fill level measuring device are/is transmitted to the superordinate control unit automatically and/or upon query of the superordinate control unit.

In a preferred further development of the invention, a fill level and/or status information, especially diagnostic information and/or information concerning the current process, ascertained from the echo curve and/or the envelope curve are/is transmitted by means of the communication network from the superordinate control unit to at least one display unit and displayed by the display unit. In such case, of concern is, thus, a multidirectional communication network, thus, for example, a bidirectional communication network.

In this preferred further development of the invention, displayed on the display unit can be not only the fill level, but, also, the extent to which the currently running process influences the echo curve, thus, e.g. "evaluation parameters essentially unchanged", "evaluation parameters greatly changed on account of the process", "ascertained plausibility of the fill level high/low on account of the process", "Warning: In the case of the currently running process, no reliable ascertaining of the fill level is possible".

In an embodiment of the invention, a display unit is arranged on the field device.

In an embodiment of the invention alternative thereto, at least one display unit is arranged away from the process plant, and/or the at least one display unit is part of a mobile end device.

The display unit arranged away from the process plant can be, for example, part of a computer remote from the process plant. The display unit arranged away from the process plant can e.g. also be part of an additional superordinate control unit remote from the process plant.

The mobile end device can be a smart phone, a tablet, a data glasses, or a mobile end device designed specifically for process automation, such as the FieldXpert device sold by Endress+Hauser.

In an additional further development of the invention, a number of echo curves and/or envelope curves are recurringly ascertained, transmitted to the superordinate control unit and stored in the superordinate control unit and/or in a memory unit connected therewith. The superordinate control unit can then take an earlier ascertained echo curve and/or envelope curve into consideration in the evaluation of a currently registered echo curve and/or envelope curve. In this further development, thus, the history of the echo curve and/or envelope curve is combined with the currently running process. If, for example, an initially known fill level is specified, then the history enables using the echo tracking known in the state of the art and mentioned above.

In an embodiment of the invention, due to the current process, the currently ascertained echo curve and/or envelope curve are/is discarded and the wanted echo signal of an earlier ascertained echo curve and/or envelope curve is used for determining and/or monitoring the fill level. In this embodiment, thus, one returns to an earlier ascertained echo curve and/or envelope curve. This case can occur, when, due to the current process, it is to be assumed, e.g. due to experience gained in the initializing operation, that no reliable determining and/or monitoring of the fill level is possible during the currently running process.

In an embodiment of the invention, the current process includes the control of actuators, especially valves and/or pumps, arranged at an inlet and/or outlet of the container. Especially, the plausibility of the identified wanted echo signal is checked based on the current state of the actuators and based on comparison of the currently ascertained echo curve and/or envelope curve with an earlier ascertained echo curve and/or envelope curve.

Of course, supplementally or alternatively to checking the plausibility, also the evaluation of the echo curve and/or envelope curve can be adapted. A changed state of the actuators can change the fill substance, especially movement of the surface of the fill substance, e.g. causing turbulence on surface or foam. As already indicated above, this leads to an increase of the number of disturbance echo signals and/or an amplification of the echo signal amplitude of the disturbance echo signals. In this way, e.g. increased foaming requires an adapted evaluating of the echo curve and/or envelope curve, especially, for instance, in the case of parameters, which influence the identification of the disturbance echo signals in an evaluation algorithm.

Another, movement related change of the fill substance can also be present, when objects installed in the container are moved. In an additional embodiment of the invention, the current process includes, consequently, an introduction of installed objects in the container and/or a moving of installed objects in the container. Especially, the process includes a stirring with a stirrer located in the container and/or a change of an RPM of a stirring with a stirrer located in the container. If, furthermore, installed objects such as ladders are introduced into and/or moved in an end region of the container toward the fill level measuring device, it can, for example, be required that a change of the above mentioned masking curve, or block distance, be used for the evaluation of the echo curve and/or envelope curve.

In an additional embodiment of the invention, the current process includes an addition and/or a distilling off of a medium. In this way, especially the dielectric constant of the fill substance increases or decreases and/or a fraction of foam in the fill substance increases or decreases.

A change of the dielectric constant can, for example, require an adapting of the above mentioned threshold values, which are required in the identification of the echo signals in the echo curve and/or envelope curve. If it is, for example, known in the superordinate control unit that from a certain point in time a medium is added, whereupon the dielectric constant increases or decreases, then at such point in time the echo curve and/or envelope curve are/is evaluated with a correspondingly adapted threshold value.

In an additional embodiment of the invention, the current process includes a cleaning in the container of the container and/or of objects installed in the container. Such an on-site-cleaning (called "Cleaning In Place" or CIP for short) leads, for example, in given cases, to the fact that a reliable evaluating of the echo curve and/or envelope curve is not possible. In such case, e.g., the above mentioned historical data can be used.

In an additional embodiment of the invention, the fill substance comprises solid particles, wherein the current process comprises a fluidizing of the fill substance. A fluidized bed is formed. Referred to as a fluidized bed is a fill substance of solid particles, which is placed in a fluidized state by an upwardly directed flow of a fluid. The concept "fluidized" indicates that the fill substance, otherwise just sitting there, now has fluid-like properties. Because of the process of fluidizing, the fill substance has from a point in time known to the superordinate control unit suddenly fluid-like properties. This changes the reflection properties of the surface of the fill substance and can therewith have a determinative influence on the echo curve and/or envelope curve. Therefore also in this case, an adapting of the evaluation of the echo curve and/or envelope curve can be required.

In an additional embodiment, the container is movable, wherein the process comprises a moving of the movable container. The movable container can be a tiltable or other container not durably stationary during measurement operation, such as, for example, swap containers, railcars, trucks, etc.

In an additional embodiment of the invention, the current process includes a heating of the fill substance.

Of course, the process currently occurring in measurement operation can also comprise a combination of the processes, which are set forth in the various embodiments of the invention, thus, e.g. a simultaneous stirring with a stirrer and the addition of a material. In given cases, only such a combination of at least two, in principle, independent sub-processes requires an adapting of the evaluation of the echo curve and/or envelope curve. Such can, for example, be the case, when foam is formed only by heating the fill substance in combination with a simultaneous stirring of the fill substance. To what extent at least two, in principle, independent subprocesses require only in combination, or in cooperation, an adapting of the evaluation can be detected e.g. in the initializing operation.

BRIEF DESCRIPTION OF THE DRAWINGS

The invention will now be explained in greater detail based on the appended, schematic drawing, wherein equal reference characters refer to equal features. When perspicuity requires or it otherwise appears sensible, already shown reference characters are omitted in subsequent figures. The figures of the drawing show as follows.

DETAILED DESCRIPTION

Figure 1:
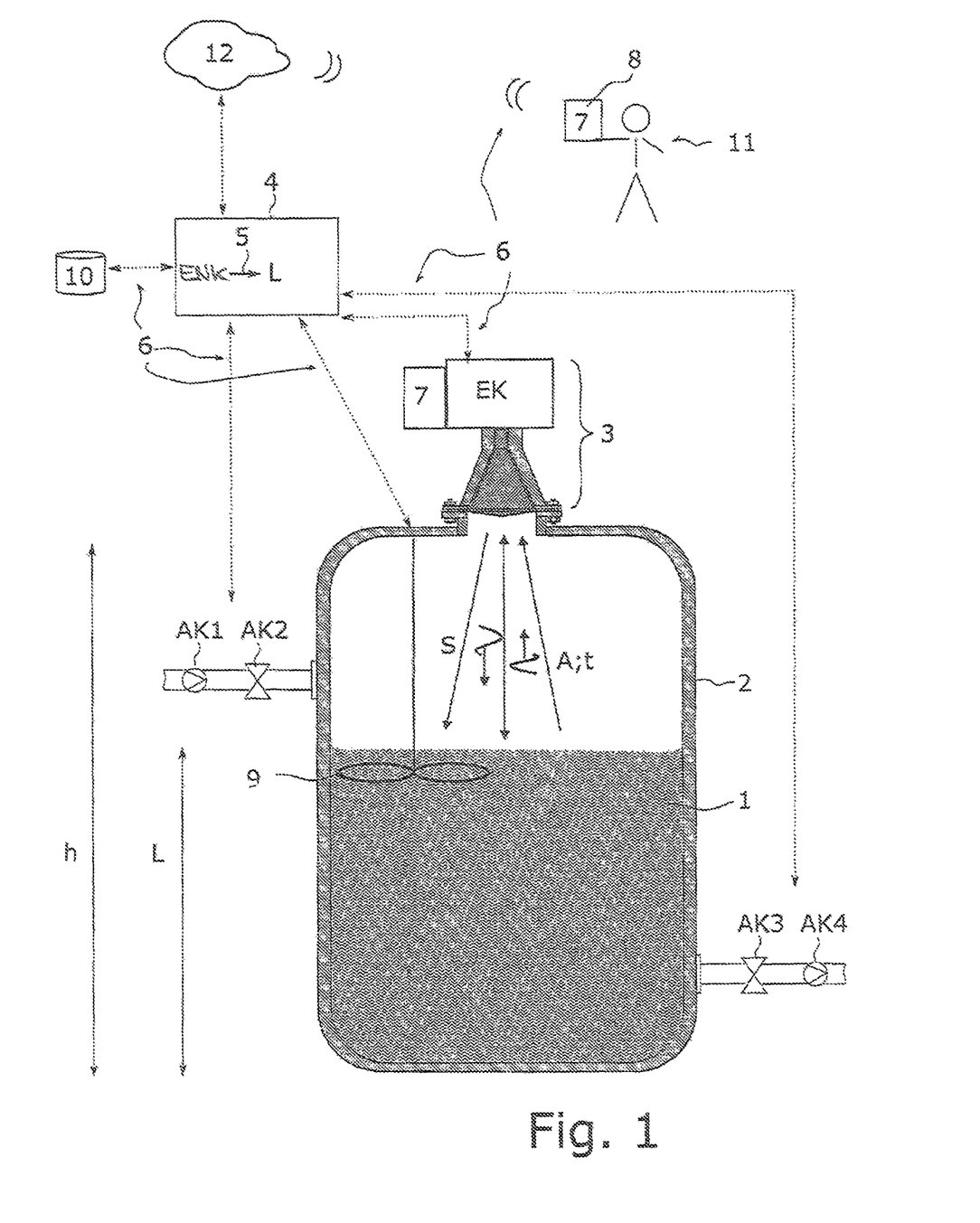
FIG. 1 shows a side view of an apparatus embodied for executing the method of the present disclosure.

FIG. 1 shows a typical arrangement of a fill level measuring device 3 working according to the travel time principle and mounted on a container 2. Located in the container 2 is a fill substance 1, whose fill level L is to be determined by the fill level measuring device 3. For this, the fill level measuring device 3 is placed at a known installed height h above the fill substance 3 on the container 2. In such case, the container 2 can, depending on the application, be even more than 30 m high. The fill level measuring device 3 is arranged in such a manner on the container 2 that it sends transmitted signals S in the direction of the fill substance 1 in the container 2 and, based on signal fractions reflected back in the container 2, ascertains an echo curve, which shows the amplitudes A of the reflected signal fractions as a function of travel time t. The transmitted signals S, and the reflected signals, are electromagnetic waves of radar technology, i.e. the fill level measuring device 3 is embodied as a radar fill level measuring device 3.

In the case of fill level measuring devices of the state of the art, an echo curve EK is created based on the amplitudes A and the travel times t and a wanted echo signal WE is identified in the echo curve, which corresponds to the reflection of the transmitted signal S on the surface of the fill substance 1 and whose travel time t depends on the distance h-L of the fill level measuring device 3 to the surface of the fill substance 1. The fill level L is then calculated based on the measured travel time t of the wanted echo signal WE.

In the method of the invention, in such case, the echo curve EK is first created in the fill level measuring device 3. The fill level measuring device 3 includes for this a local evaluation unit, such as, for example, a microprocessor, and, in given cases, a memory unit. In given cases, directly created supplementally in the fill level measuring device 3 is an envelope curve ENK enveloping the echo curve EK. The fill level measuring device 3 is connected via the communication network 6, such as, for instance, a bus system, e.g. a "PROFIBUS", "HART" or "wireless HART" system or via another of the above mentioned communication networks 6 with a superordinate control unit 4. The superordinate control unit 4 is, for example, a process control system or a programmable logic control unit. Via the communication network 6, the echo curve EK and/or the envelope curve ENK are/is transmitted to the superordinate control unit 4.

In the superordinate control unit 4, an evaluation of the echo curve EK takes place. In such case, for example, the envelope curve ENK is created and evaluated and, in such case, the wanted echo signal WE of the envelope curve ENK identified, wherein the wanted echo signal WE corresponds to the reflection of the transmitted signal S on the surface of the fill substance 1. Since its travel time t depends on the distance h-L between the fill level measuring device 3 and the surface of the fill substance 1, the fill level L is then determined based on the measured travel time t of the wanted echo signal WE. For this, at least one parameter 5 is used.

In the method of the invention, the fill substance 1 and/or the container 2 is subjected to at least one current process P1, P2, which is controlled from the superordinate control unit 4. For this, the superordinate control unit 4 controls, for example, actuators AK1,AK2,AK3,AK4, such as valves and pumps, arranged on inlets and/or outlets of the container 2. Arranged in the container 2 are, additionally, installed objects 9, for example, a stirrer embodied for stirring the fill substance 1. In the process P1,P2, thus, for example, the actuators and/or installed objects are controlled from the superordinate control unit 4 in a certain manner, wherein the actuators AK1,AK2,AK3,AK4 and/or installed objects 9 are also connected via the communication network 6 with the superordinate control unit 4. In such case, the conditions current as a function of the current process P1;P2 and the information concerning such, present in the superordinate control unit 4, relative to the fill substance 1 and/or the container 2 are utilized. Such can be used, on the one hand, in order to check the plausibility of the ascertained wanted echo signal WE and/or, on the other hand, dynamically to adapt the evaluation to the current process P1;P2.

The plausibility of the ascertained wanted echo signal WE is, for example, checked, in case, with knowledge of the currently running process, an increase or decrease of fill level L is to be expected, for example, due to the state of valves, pumps and/or due to a controlled addition of a medium 13, either of which can influence the volume occupied in the container 2 by the fill substance 1 and therewith the fill level L.

The dynamic adapting of the evaluation of the echo curve EK and/or envelope curve ENK occurs especially thereby that in the case of a change of the process, for example, P1 to P2, the algorithm for identification of the wanted echo signal WE from the echo curve and/or envelope curve is correspondingly adapted.

This is shown in greater detail in FIG. 2 by way of example and will be explained below, wherein, of course, no limitation of the invention to the details of this example is intended.

Figure 2:
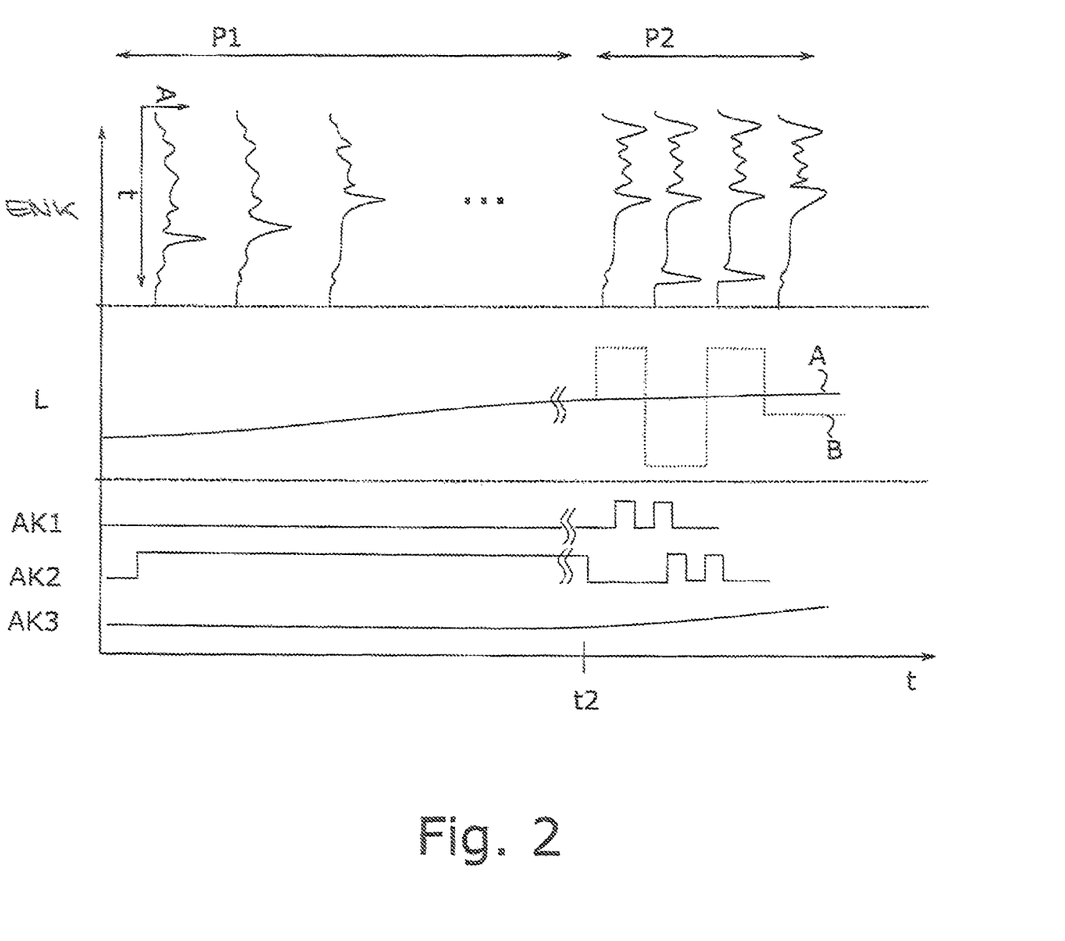
FIG. 2 shows an embodiment of the method of the present disclosure.

FIG. 2 shows, in the upper part, envelope curves ENK, thus, amplitude/travel time functions, registered recurringly (for example, in regular intervals) for two processes P1 and P2 running one after the other.

During the first process P1, the fill level L is ascertained by the superordinate unit 4 and displayed in the lower part of FIG. 2. Additionally shown in the lower part of FIG. 2 are the states of three actuators, AK1 (pump: on/off), AK2 (valve: closed/open) and AK3 (stirrer: RPM). In such case, the parameters for identification of the wanted echo signal WE are adapted to the process P1 (here: slow flowing in of the fill substance through the open valve and slow stirring with a constant RPM). The fill level L ascertained from the travel time of the wanted echo signal WE with the parameters adapted to the process P1 rises continuously during the first process P1 having a first process duration.

At a point in time t2, the second process P2 begins, comprising the simultaneous additional turning on of the pump and the increasing of the RPM of the stirrer. Above a certain RPM, e.g. turbulence appears on the upper surface of the fill substance 1 and/or the upper surface of the fill substance 1 acquires a trombus-shape. The increasing of the RPM in combination with the states of the actuators AK1, AK2 influences the fill substance 1 in such a manner that additional disturbance echo signals DES appear in the envelope curves ENK at shorter travel times t, i.e. in the upper regions of the envelope curves ENK.

Without a corresponding adapting of the evaluation relative to the identification of the wanted echo signal WE and/or the disturbance echo signals DES, no reliable ascertaining of the fill level L would be possible; this is illustrated by the dotted line B. If, in contrast, according to the invention, the evaluation is correspondingly adapted, then a continued reliable ascertaining of the fill level L is enabled (solid line A). In such case, for example, the masking curve is correspondingly adapted, especially for the duration of the process P2. In this way, an advantageously increased availability of the fill level measuring device is achieved by the method of the invention.

In such case, the knowledge concerning for which process P1,P2 which parameters should be adapted for the evaluation of the envelope curve ENK was won in an initializing operation. In such case, it was observed in the initializing operation by moving through the processes P1 and P2 that a simultaneous stirring with increased RPM and a pumping leads to the disturbance echo signals DES, which can be correspondingly masked out e.g. with an adapted masking curve correspondingly applied in the later measurement operation.

Of course, similar or other specifications can be used for adapting the evaluation, especially specifications based on earlier collected empirical values from other process plants. These empirical values can be stored e.g. in a database of a cloud 12 (see FIG. 1) connected with the superordinate control unit 4 via the communication network 6, or even in a memory unit 10, such as, for example, a local database.

Additionally stored in the memory unit 10 and/or the cloud 12 shown in FIG. 1 can also be historical echo curves EK and/or envelope curves ENK. These are taken into consideration e.g. when the currently running process P1;P2 makes a reliable evaluating of the echo curve EK and/or envelope curve ENK impossible, for example, in the case of a CIP process. These often involve increased presence of spray droplets, or fog, which leads to a high number of disturbance echo signals DES.

Especially advantageous in connection with the method of the invention is when the measured values for the fill level L currently ascertained by the superordinate unit 4 are displayed on a display unit 7, especially also simultaneously with information concerning the currently running process P1;P2. This is enabled by the fact that the evaluation of the echo curve EK takes place in the superordinate unit 4 and the superordinate unit 4 is connected to the cloud 12, or to the communication network 6.

The display unit 7 can, in such case, be arranged on the fill level measuring device 3. In an additional advantageous embodiment, the display unit can, such as shown in FIG. 1, however, also be part of a mobile end device 8, such as, for example, a smartphone, so that the current measured value for the fill level L can be displayed to a user 11 at any location within or away from the process plant.

The invention claimed is:

1. A method for determining and/or monitoring a fill level of a fill substance in a container of a process plant with a fill level measuring device working according to the travel time principle and in measurement operation transmitting transmitted signals in the direction of the fill substance in the container and, based on signal fractions reflected back in the container, ascertaining an echo curve that represents an amplitude of the reflected back signal fractions as a function of travel time, wherein during the determining and/or the monitoring of the fill level the fill substance and/or the container are/is subject to a current process, the method comprising:

transmitting the echo curve to a superordinate control unit and/or creating an envelope curve enveloping the echo curve and transmitting the envelope curve to the superordinate control unit;

evaluating the echo curve and/or the envelope curve by the superordinate control unit;

identifying, during the evaluation, disturbance echo signals of the echo curve and/or the envelope curve;

identifying in the evaluation of the echo curve and/or the envelope curve a wanted echo signal of the echo curve and/or the envelope curve, wherein a travel time of the wanted echo signal is used as basis for ascertaining the fill level;

furnishing information concerning the current process to the superordinate control unit;

checking a plausibility of the wanted echo signal based on the information concerning the current process; and dynamically adapting the identifying of the wanted echo signal to the current process based on the information concerning the current process;

adapting the identification of the disturbance echo signals to the current process;

wherein the evaluation of the echo curve and/or the envelope curve, including the identification of the wanted echo signal and/or the disturbance echo signals, occurs by means of an evaluation algorithm with at least one freely selectable parameter, wherein the at least one freely selectable parameter is established based on the current process, wherein in an initializing operation different from measurement operation, the fill substance and/or the container are/is subjected to the current process arising in measurement operation, the method further comprising:

sending in the initializing operation transmitted signals from the fill level measuring device in the direction of the fill substance in the container and ascertaining an echo curve based on signal fractions reflected back in the container;

transmitting the echo curve to the superordinate control unit and/or creating an envelope curve enveloping the echo curve and transmitting the envelope curve to the superordinate control unit:

registering by the superordinate control unit influences of the current process on the echo curve and/or the envelope curve;

determining from the influences a specification for adapting the evaluation, including an adapting of the identification of the wanted echo signal and/or the disturbance echo signals; and selecting the at least one freely selectable parameter and storing the selection in the superordinate control unit, wherein in measurement operation then the specification stored in the initializing operation, including the at least one freely selectable parameter, is used in the dynamic adapting of the evaluation to the current process, including in the dynamic adapting of the identification of the wanted echo signal and/or the disturbance echo signals.

2. The method as claimed in claim 1, wherein the echo curve and/or the envelope curve are/is transmitted recurringly, wired and/or wirelessly, to the superordinate control unit via a communication network, including via a fieldbus of automation technology and/or via Ethernet.

3. The method as claimed in claim 1, wherein the echo curve and/or the envelope curve are/is transmitted to the superordinate control unit from the fill level measuring device only upon query of the superordinate control unit.

4. The method as claimed in claim 1, wherein the echo curve and/or the envelope curve are/is transmitted to the superordinate control unit from the fill level measuring device automatically and/or upon query of the superordinate control unit.

5. The method as claimed in claim 1, wherein a fill level, status information, diagnostic information, and/or information concerning the current process ascertained from the echo curve and/or the envelope curve are/is transmitted via the communication network from the superordinate control unit to at least one display unit and displayed by the at least one display unit.

6. The method as claimed claim 5, wherein the at least one display unit is arranged on the fill level measuring device.

7. The method as claimed in claim 5, wherein the at least one display unit is arranged away from the process plant, and/or wherein the at least one display unit is part of a mobile end device, including a laptop, tablet, smartphone, and/or a data glasses.

8. The method as claimed in claim 1,
wherein the current process includes a control of actuators, including valves and/or pumps, arranged at an inlet and/or outlet of the container,
wherein the plausibility of the identified wanted echo signal is checked based on the current state of the actuators and based on comparison of the currently ascertained echo curve and/or envelope curve with an earlier ascertained echo curve and/or envelope curve.

9. The method as claimed in claim 1,
wherein the current process includes an introduction of installed objects in the container and/or a moving of installed objects in the container, including a stirring with a stirrer located in the container and/or a change of an RPM of a stirring with a stirrer located in the container.

10. The method as claimed in claim 1,
wherein the current process includes an addition and/or a distilling off of at least one medium, by which a dielectric constant of the fill substance increases or decreases and/or a fraction of foam in the fill substance increases or decreases.

11. The method as claimed in claim 1,
wherein the current process includes a cleaning in the container of the container and/or of objects installed in the container.

12. The method as claimed in claim 1,
wherein the fill substance comprises solid particles, and wherein the current process includes a fluidizing of the fill substance.

13. The method as claimed in claim 1,
wherein the container is movable, and wherein the current process comprises a moving of the movable container.

14. The method as claimed in claim 1,
wherein the current process includes a heating of the fill substance and/or of the container.

15. A method for determining and/or monitoring a fill level of a fill substance in a container of a process plant with a fill level measuring device working according to the travel time principle and in measurement operation transmitting transmitted signals in the direction of the fill substance in the container and, based on signal fractions reflected back in the container, ascertaining an echo curve that represents an amplitude of the reflected back signal fractions as a function of travel time, wherein during the determining and/or the monitoring of the fill level the fill substance and/or the container are/is subject to a current process, the method comprising:
  transmitting the echo curve to a superordinate control unit and/or creating an envelope curve enveloping the echo curve and transmitting the envelope curve to the superordinate control unit:
  evaluating the echo curve and/or the envelope curve by the superordinate control unit
  identifying in the evaluation of the echo curve and/or the envelope curve a wanted echo signal of the echo curve and/or the envelope curve, wherein a travel time of the wanted echo signal is used as basis for ascertaining the fill level;
  furnishing information concerning the current process to the superordinate control unit
  checking a plausibility of the wanted echo signal based on the information concerning the current process; and
  dynamically adapting the identifying of the wanted echo signal to the current process based on the information concerning the current process,
wherein a plurality of echo curves and/or envelope curves are recurringly ascertained, transmitted to the superordinate control unit, and stored in the superordinate control unit and/or in a memory unit connected with the superordinate control unit, the method further comprising:
  taking into consideration an earlier ascertained echo curve and/or envelope curve in the evaluation of a currently ascertained echo curve and/or envelope curve by the superordinate unit.

16. The method as claimed in claim 15, further comprising:
  due to the current process, discarding the currently ascertained echo curve and/or envelope curve and using a wanted echo signal of an earlier ascertained echo curve and/or envelope curve for determining and/or monitoring the fill level.

* * * * *